(12) United States Patent
Kamachi et al.

(10) Patent No.: US 10,245,969 B2
(45) Date of Patent: Apr. 2, 2019

(54) POWER SOURCE CONTROL DEVICE AND POWER SOURCE CONTROL METHOD

(71) Applicant: MITSUBISHI JIDOSHA KOGYO KABUSHIKI KAISHA, Tokyo (JP)

(72) Inventors: Makoto Kamachi, Tokyo (JP); Takayoshi Kawamoto, Tokyo (JP); Naoki Imakita, Tokyo (JP); Jun Soeda, Tokyo (JP); Hirofumi Yagura, Tokyo (JP); Hirotaka Sugimoto, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/833,651

(22) Filed: Dec. 6, 2017

(65) Prior Publication Data

US 2018/0162230 A1    Jun. 14, 2018

(30) Foreign Application Priority Data

Dec. 9, 2016  (JP) .................................. 2016-238979

(51) Int. Cl.
| | |
|---|---|
| *B60L 11/18* | (2006.01) |
| *B60L 1/00* | (2006.01) |
| *B60L 3/00* | (2019.01) |

(52) U.S. Cl.
CPC ............ *B60L 11/1862* (2013.01); *B60L 1/00* (2013.01); *B60L 3/0046* (2013.01); *B60L 11/1809* (2013.01); *B60L 11/1868* (2013.01); *B60L 2210/10* (2013.01); *B60L 2240/42* (2013.01); *B60L 2250/16* (2013.01); *Y02T 10/7005* (2013.01); *Y02T 10/7066* (2013.01); *Y02T 10/7072* (2013.01); *Y02T 10/7216* (2013.01); *Y02T 90/127* (2013.01); *Y02T 90/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 2012/0299377 A1* | 11/2012 | Masuda | ................ | B60L 11/005 307/10.1 |
| 2015/0286233 A1* | 10/2015 | Takemoto | ........... | B60L 11/1861 700/297 |
| 2016/0046202 A1* | 2/2016 | Yamamoto | ................ | B60L 1/14 307/10.1 |

FOREIGN PATENT DOCUMENTS

| | | |
|---|---|---|
| EP | 2535218 A1 | 12/2012 |
| JP | 2009-227189 A | 10/2009 |
| JP | 2011-155775 A | 8/2011 |
| JP | 4900090 B2 | 3/2012 |
| WO | WO 2014/162882 A1 | 10/2014 |

* cited by examiner

*Primary Examiner* — Thomas G Black
*Assistant Examiner* — Ana D Thomas
(74) *Attorney, Agent, or Firm* — Birch, Stewart, Kolasch & Birch, LLP

(57) ABSTRACT

A power source control device includes a charging state detector configured to detect a charging state of a drive battery mounted on an electric vehicle and a power source mode switch configured to switch a power source mode of the electric vehicle, wherein the power source mode switch configured to switch the power source mode to an OFF mode in a case that charging of the drive battery is stopped while the power source mode is set at an ON mode.

18 Claims, 3 Drawing Sheets

POWER SOURCE CONTROL DEVICE AND POWER SOURCE CONTROL METHOD

CROSS REFERENCE TO RELATED APPLICATIONS

This application is based on Japanese Patent Application (No. 2016-238979) filed on Dec. 9, 2016, the contents of which are incorporated herein by reference.

BACKGROUND OF THE INVENTION

1. Field of the Invention

The present invention relates to a power source control device and a power source control method for controlling the power source mode of an electric vehicle.

2. Description of the Related Art

A one-touch start system (OSS) has been widespread in which the engine of a vehicle is started by switch operation instead of conventional key operation (for example, refer to JP-B-4479400). In the one-touch start system, the switch operation is generally effective only in the case that a smart key portable device is inside the vehicle to prevent vehicle theft and other crimes.

Furthermore, JP-B-4900090 has proposed a control method in which, in order that an auxiliary equipment battery is prevented from being exhausted, in the case that the setting of the power source mode at the ACC (accessory power ON) mode or the IG-ON (ignition power ON) mode continues for a predetermined time during the stoppage of the vehicle and while the engine is not operated, the power source mode is automatically set to the IG-OFF (ignition power OFF) mode if the smart key portable device (keyless operation key) is not inside the vehicle.

In an electric vehicle that uses electric power as at least part of the drive energy of the vehicle, a technology has been known in which the power source mode can be switched to the ON mode (ACC-ON or IG-ON) while the battery is charged by an external charger so that the electric devices in the vehicle can be used. While an electric device is used during the charging by using this technology, in the case that the charging is stopped because the battery is fully charged or stopped due to a power failure, for example, there occurs a problem that, if the use of the electric device by the user continues for a long time, the remaining amount of the battery lowers.

More specifically, an electric vehicle is generally provided with a drive battery (high-voltage battery) storing electric power for driving the vehicle and an auxiliary equipment battery (12 V battery) for storing electric power for driving auxiliary equipment, such as electric devices. The electric power supplied from the external charger is first stored in the drive battery. The electric power of the drive battery is stepped down by a DC/DC converter as necessary and then supplied to the auxiliary equipment battery.

For example, in the case that the operation of the DC/DC converter continues even after the stop of the charging, the remaining amount of the drive battery decreases if the power source mode is not switched to the OFF mode. Furthermore, in the case that the operation of the DC/DC converter is stopped after the stop of the charging, the auxiliary equipment battery is exhausted unless the power source mode is switched to the OFF mode.

Although JP-B-4900090 discloses the technology for preventing battery exhaustion, even if the technology of JP-B-4900090 is applied, if the keyless operation key is inside the vehicle, the power source mode remains at the ON mode. Hence, in the case that the user is inside the vehicle and does not notice the stop of the charging, the above-mentioned problem cannot be solved.

SUMMARY OF THE INVENTION

The present invention is made in consideration of the above-mentioned circumstances, and an object of the present invention is, in an electric vehicle in which electric devices provided therein are usable during battery charging, to prevent the lowering of the remaining amount of a drive battery or the exhaustion of an auxiliary equipment battery, the lowering or the exhaustion being not intended by the user.

The present invention provides a power source control device equipped with a charging state detection section for detecting the charging state of the drive battery mounted on an electric vehicle and a power source mode switching section for switching the power source mode of the electric vehicle, wherein the power source mode switching section switches the power source mode to the OFF mode in the case that the charging of the drive battery is stopped while the power source mode is set at the ON mode.

Furthermore, the present invention provides a power source control method including a detecting process for detecting the charging state of the drive battery mounted on an electric vehicle and a power source mode switching process for switching the power source mode of the electric vehicle, wherein the power source mode switching process switches the power source mode to the OFF mode in the case that the charging of the drive battery is stopped while the power source mode is set at the ON mode.

With the present invention, in the case that the charging of the drive battery is stopped while the power source mode of the electric vehicle is set at the ON mode, the power source mode is automatically switched to the OFF mode. This is advantageous for preventing the lowering of the remaining amount of the drive battery or the exhaustion of the auxiliary equipment battery regardless of whether the user is inside the vehicle.

DETAILED DESCRIPTION OF THE EXEMPLARY EMBODIMENTS

A preferred embodiment of a power source control device according to the present invention will be described below in detail referring to the accompanying drawings.

Figure 1:
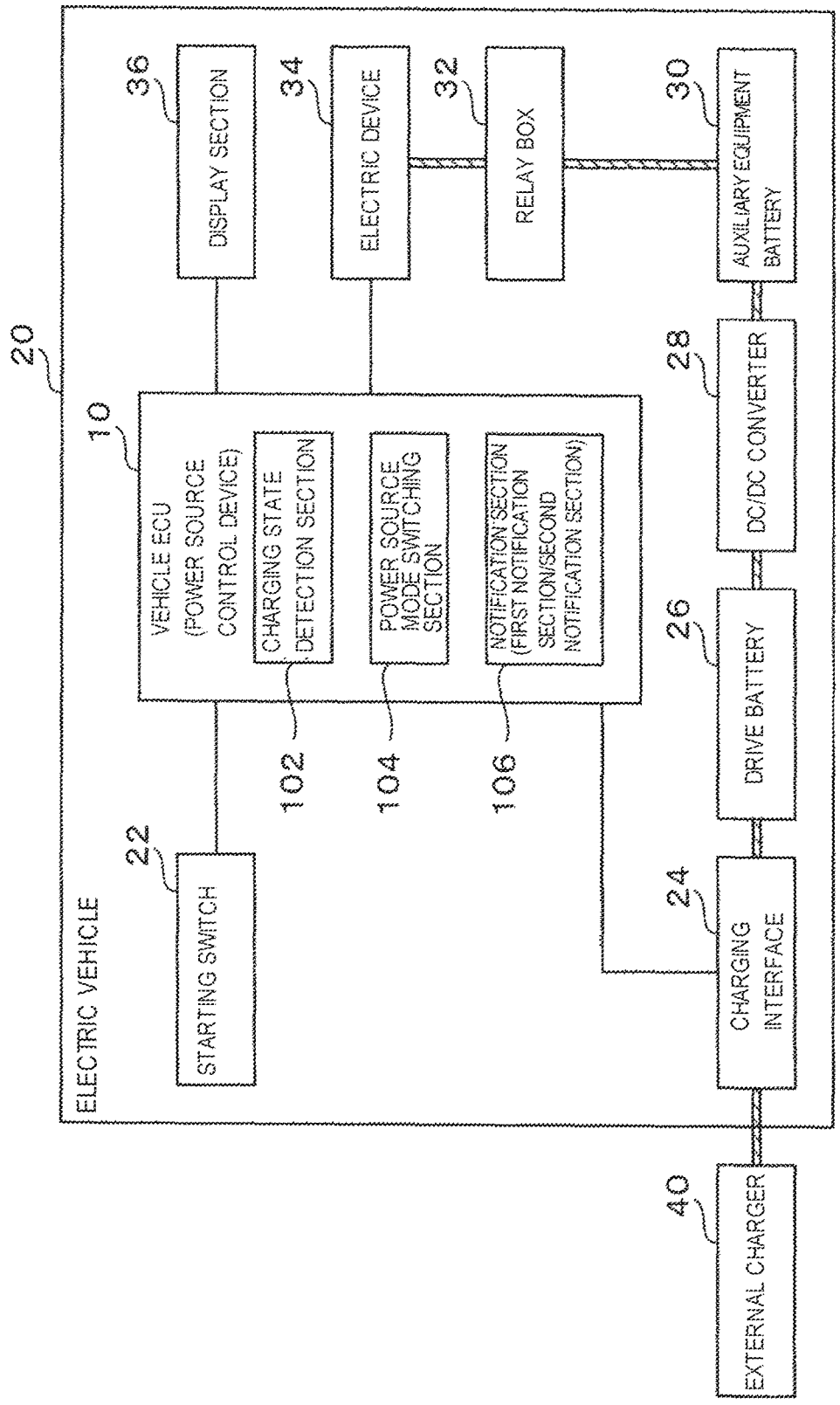
FIG. 1 is a block diagram showing a configuration of an electric vehicle equipped with a power source control device according to an embodiment.

FIG. 1 is a block diagram showing a configuration of an electric vehicle 20 equipped with the power source control device according to the embodiment.

The electric vehicle 20 is an externally chargeable vehicle that uses electric power as at least part of the drive energy of an electric vehicle, a plug-in hybrid vehicle, etc. Although the drive mechanism of the electric vehicle 20 is not shown in FIG. 1, the electric vehicle 20 is equipped with a drive motor that is operated by the electric power stored in a drive battery 26.

In addition to a vehicle ECU 10 functioning as the power source control device, the electric vehicle 20 is equipped with a starting switch 22, a charging interface 24, the drive battery 26, a DC/DC converter 28, an auxiliary equipment battery 30, a relay box 32, electric devices 34 and a display section 36.

The starting switch 22 (power switch) is a switch for switching the power source mode of the electric vehicle 20 and is provided, for example, on the instrument panel in the vicinity of the steering wheel of the vehicle. In this embodiment, the power source mode of the electric vehicle 20 has an ACC ON mode in which only an accessory power source (ACC) is turned ON, an IG ON mode in which the accessory power source and an ignition power source (IG) are turned ON and all the electric devices 34 are usable, and an OFF mode in which the accessory power source and the ignition power source are turned OFF. The ACC ON mode and the IG ON mode (the state in which either of the power sources is ON) are combined into a mode and referred to as the mode in which "the power source mode is set at the ON mode" in the following descriptions.

Generally speaking, in the ACC ON mode, electric power is supplied to auxiliary equipment, such as a car navigation system and a car stereo device, whereby the auxiliary equipment can be used. Furthermore, in the IG ON mode, all the electric devices including devices requiring large power consumption, such as an air conditioner and an electric wiper device, can be used.

In the state in which the power source mode of the electric vehicle 20 is set at the OFF mode, when the user presses the starting switch 22 one time without stepping on the brake pedal, the power source mode is set to the ACC ON mode. When the user presses the starting switch two times, the power source mode is set to the IG ON mode (in the case of a hybrid vehicle, its engine is not started). When the user presses the starting switch three times, the power source mode returns to the OFF mode. Furthermore, when the user presses the starting switch 22 one time while stepping on the brake pedal, the power source mode is set to the IG ON mode (in the case of a hybrid vehicle, its engine is also started). When the user presses the starting switch two times, the power source mode returns to the OFF mode.

In order to validate the operation of the starting switch 22, the user is required to bring a keyless operation key into the electric vehicle 20.

The charging interface 24 is an interface to which an external charger 40 is connected, and the interface is, for example, a connector provided on the outside of the vehicle body. The connector is provided with a power line through which the current supplied from the external charger 40 flows and a communication line through which communication is carried out between the connector and the control section on the side of the external charger 40.

In the case that the external charger 40 is a quick charger, the charging interface 24 is directly connected to the drive battery 26. In the case that the external charger 40 is an ordinary charger, the charging interface 24 is connected to the drive battery 26 via an in-vehicle charger, not shown.

The drive battery 26 is a high-voltage battery of about 300 V and stores the electric power for driving the electric vehicle 20. The drive battery 26 is charged by the electric power supplied from the external charger 40 that is connected to the battery via the charging interface 24. The electric power stored in the drive battery 26 is used to operate not only the drive motor but also an electric air conditioner.

After stepping down the electric power stored in the drive battery 26, the DC/DC converter 28 supplies the obtained electric power to the auxiliary equipment battery 30.

The auxiliary equipment battery 30 is a low-voltage battery of about 12 V and stores the electric power for operating the electric devices inside the electric vehicle 20. The electric power of the drive battery 26 is stepped down by the DC/DC converter 28 and the obtained electric power is supplied to the auxiliary equipment battery 30 to charge the auxiliary equipment battery 30.

The relay box 32 accommodates relays for connecting the auxiliary equipment battery 30 to various kinds of electric devices 34. The electric power to be supplied to the electric devices 34 can be switched ON or OFF by connecting or disconnecting the relays inside the relay box 32. In other words, the power source mode is switched by the connection/disconnection of the relays inside the relay box 32.

The electric devices 34 are devices provided inside the electric vehicle 20 and operate by receiving the electric power supplied from the auxiliary equipment battery 30 or the drive battery 26. Many of the electric devices 34 operate by receiving the electric power supplied from the auxiliary equipment battery 30, and some of the electric devices 34, such as an electric air conditioner, operate by receiving the electric power supplied from the drive battery 26. The power lines from the drive battery 26 to the electric devices 34 are not shown for convenience of illustration.

More specifically, examples of the electric devices 34 include head lamps, a car navigation system, a car stereo device, an electric wiper device and an electric air conditioner. Furthermore, in the case that a power supply plug receptacle is provided inside (or outside) the electric vehicle 20, electric power can be supplied to an electric device 34 brought in from the outside of the vehicle by inserting the insertion plug of the device into the plug receptacle.

The display section 36 is, for example, a compact display (combination meter) provided on the instrument panel, and displays various kinds of information, such as vehicle states, under the control of the vehicle ECU 10 described later.

The vehicle ECU 10 is composed of a CPU, a ROM for storing and memorizing control programs, a RAM serving as the operation area of the control programs, an EEPROM for holding various kinds of data so as to be rewritable, an interface section for interfacing with, for example, peripheral circuits, and functions as the power source control device according to this embodiment.

Although it is explained in this embodiment that various kinds of processes described later are carried out only by the vehicle ECU 10, a plurality of processing sections may cooperate to carry out the various kinds of processes described later. For example, in addition to the vehicle ECU 10, processing sections, such as an OSS controller for controlling a one-touch start system (OSS), a BMU (battery management unit) for monitoring the state of the drive battery 26, may be used, and these processing sections may cooperate to carry out the various kinds of processes described later.

The above-mentioned CPU executes the above-mentioned control programs, whereby the vehicle ECU 10 functions as a charging state detection section 102, a power source mode switching section 104 and a notification section 106.

The charging state detection section 102 detects the charging state of the drive battery 26 mounted on the electric vehicle 20, more particularly, detects whether the charging has been stopped. The charging state detection section 102 monitors the charging interface 24 and detects whether the external charger 40 is connected to the charging interface 24 and whether the electric power from the external charger 40 is supplied to the charging interface 24, that is to say, whether the drive battery 26 is being charged.

The judgment as to whether the drive battery 26 is being charged is made, for example, on the basis of whether the power line provided for the charging interface 24 is energized and on the basis of the charging state information that is transmitted to the external charger 40 via the communication line.

Examples of cases in which the charging is stopped include a case in which the drive battery 26 is fully charged, a case in which a power failure has occurred in the area where the external charger 40 is provided, a case in which the external charger 40 has broken down, a case in which the charging end time having been set by a timer has been reached, and a case in which the supply of the preset amount of charged electric energy has ended.

The notification section 106, corresponding to a first notifier and a second notifier according to claims, gives a notification relating to the automatic switching of the power source mode by the power source mode switching section 104 described later. In this embodiment, the notification section 106 gives the notification by displaying a message indicating the content of the notification on the display section 36. The form of the notification by the notification section 106 is not limited to the display of such a message, but various kinds of conventionally known forms can be adopted, such as the output of sound and the lighting of a warning lamp.

The power source mode switching section 104 switches the power source mode of the electric vehicle 20. The power source mode of the electric vehicle 20 can be switched as described above by the operation of the starting switch 22 by the user. However, in the state described below, the power source mode is switched automatically by the power source mode switching section 104.

That is to say, in the case that the charging to the drive battery 26 is stopped while the power source mode is set at the ON mode, the power source mode switching section 104 switches the power source mode to the OFF mode.

In the electric vehicle 20, during the charging from the external charger 40, the power source mode can be switched to the ON mode, and the electric devices 34 inside the vehicle can be used. During the charging from the external charger 40, the DC/DC converter 28 operates and the auxiliary equipment battery 30 is also charged. Hence, during the charging of the drive battery 26, even if the electric devices 34 are used, electric power is supplied from the external charger 40, whereby the overall battery remaining amount of the electric vehicle 20 is maintained.

On the other hand, since the supply of the electric power from the external charger 40 is stopped after the charging of the drive battery 26 is stopped, the battery remaining amount inside the electric vehicle 20 decreases if the use of the electric devices 34 continues. Hence, in the case that the charging to the drive battery 26 is stopped while the power source mode is set at the ON mode, the power source mode switching section 104 switches the power source mode to the OFF mode so that the electric devices 34 cannot be used.

Furthermore, after the power source mode is automatically switched to the OFF mode by the power source mode switching section 104, the power source mode can be set again to the ON mode and the electric devices 34 can be used by the operation of the starting switch 22 by the user. Moreover, as described later, in the case that a grace time is allowed after the stop of the charging until the power source mode is switched to the OFF mode, it may be possible that the ON mode is continued in the case that the user carries out a predetermined operation during the grace time.

Still further, after the stop of the charging, the power source mode switching section 104 may switch the power source mode to the OFF mode after a predetermined time has passed, instead of immediately switching the power source mode.

This is required because, for example, in the case that the electric device 34 is a car stereo device and that music data is being fetched from, for example, a CD, or in the case that the electric device 34 is a car navigation system and that map data is being downloaded, if the power source mode is immediately switched to the OFF mode, trouble may occur, for example, in data.

In the case that such a grace time is allowed until the power source mode is switched to the OFF mode as described above, it is preferable that the notification section 106 should give a notification stating that the power source mode is switched to the OFF mode after the predetermined time (grace time) has passed after the stop of the charging.

Figure 3B:
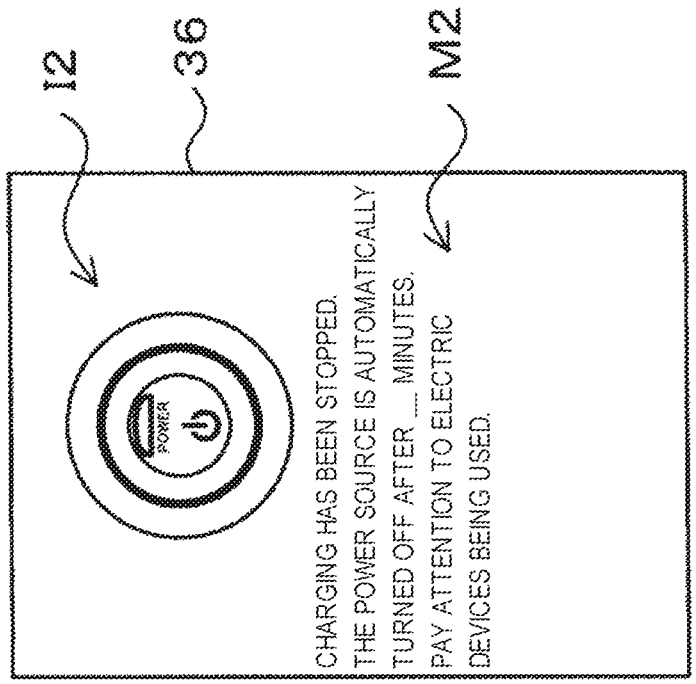
FIG. 3B is an explanatory view showing an example of another notification given by the notification section.

FIG. 3B is an explanatory view showing an example of a notification given by the notification section 106. The display section 36 displays an illustration I2 indicating the starting switch 22 and also displays a message display M2 stating that the power source is turned off after the predetermined time has passed and also stating that attention should be paid to the electric device being used.

With this notification, the user can take countermeasures for dealing with the OFF switching of the power source (for example, the operation for selecting the stop of the work being performed using the electric device 34 or the operation for not turning off the power source), whereby convenience can be improved.

The above-mentioned predetermined time (the length of the grace time until the power source mode is switched to the OFF mode) may be a fixed value or may be changed on the basis of the power consumption of the electric devices 34 being operated. In other words, the power source mode switching section 104 may change the predetermined time on the basis of the power consumption of the electric devices 34 being operated.

More specifically, for example, the upper limit value of the amount of electric energy (hereafter referred to as "allowable electric energy") that can be consumed after the stop of the charging is set, this allowable electric energy is divided by the total value of the power consumption per unit time of the electric devices 34 being operated, and the calculated value is set as the predetermined time. In other words, as the allowable electric energy is smaller or the total value of the power consumption per unit time of the electric devices 34 being operated is larger, the "predetermined time" is shorter. It is preferable that the user can set the allowable electric energy. With this setting, the decreasing amount of the remaining amount of the drive battery 26 can be suppressed within an allowable range, and the battery can easily be suppressed from being exhausted.

For example, in the case that the number of electric devices 34 being operated is increased/decreased or in the case that the operation state of an electric device 34 being operated is changed (for example, in the case that the electric device 34 being operated is an air conditioner and the preset temperature and the preset air flow rate thereof are changed), the predetermined time may be calculated each time the change is made.

Furthermore, the power source mode switching section 104 may change the predetermined time on the basis of the type of the electric device 34 being operated.

More specifically, for example, the user previously sets an electric device 34 that is desired to be operated preferentially (hereafter referred to as "the preferential electric device") and also sets a first predetermined time serving as the grace time in the case that the preferential electric device is being operated and a second predetermined time (<the first predetermined time) serving as the grace time in the case that the preferential electric device is not being operated. In the case that the preferential electric device is being operated when the charging is stopped, the predetermined time is set to the first predetermined time, and in the case that the preferential electric device is not being operated when the charging is stopped, the predetermined time is set to the second predetermined time.

Hence, the predetermined time in the case that the preferential electric device is being operated is longer than the predetermined time in the case that the preferential electric device is not being operated. As a result, the ON mode continues for a long time, whereby the use of the preferential electric device can continue for a relatively long time.

Moreover, for example, the user may set first allowable electric energy in the case that the preferential electric device is being operated and may also set second allowable electric energy (<the first allowable electric energy) in the case that the preferential electric device is not being operated, and the power consumption in the case that the preferential electric device is being operated may be allowed to be larger than that in the case that the preferential electric device is not being operated so that the use of the preferential electric device can continue for a relatively long time.

What's more, the user may specify an electric device 34 that is not desired to be operated for a long time (hereafter referred to as "the unfavorable electric device") instead of the preferential electric device, and in the case that the unfavorable electric device is being operated, the power source mode may be switched to the OFF mode in a shorter time than in the case that the unfavorable electric device is not operated.

Still further, in the case that a predetermined electric device 34 inside the electric vehicle 20 is being operated, the power source mode switching section 104 may maintain the power source mode at the ON mode even after the stop of the charging.

Examples of the predetermined electric devices 34 include head lamps, vehicle width lamps and hazard lamps, for showing the existence of the vehicle itself around the vehicle. For example, in the case that the charging is stopped due to a power failure, it is highly likely that streetlamps, illuminations, etc. around the vehicle cannot function, and it is preferable in some cases to show the existence of the vehicle itself around the vehicle by turning on the head lamps and other lamps. In this case, safety can be improved by maintaining the power source mode at the ON mode even after the stop of the charging.

In the case that the power source mode is maintained at the ON mode as described above, it is preferable that the notification section 106 should give a notification stating that attention should be paid to the lowering of the remaining amount of the battery for supplying electric power to the electric devices 34.

Figure 3A:
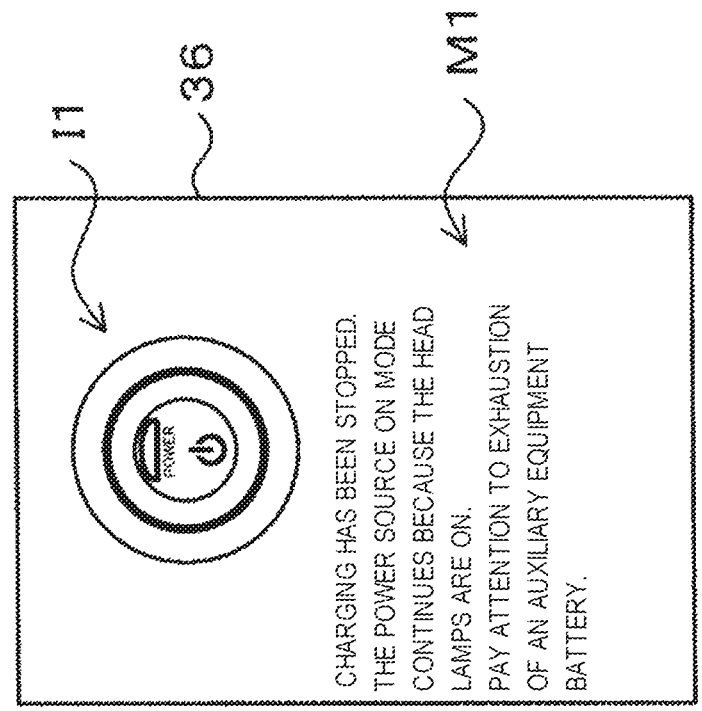
FIG. 3A is an explanatory view showing an example of a notification given by a notification section.

FIG. 3A is an explanatory view showing an example of another notification given by the notification section 106. The display section 36 displays an illustration I1 indicating the starting switch 22 and also displays a message display M1 stating that the ON mode of the power source continues because the predetermined electric device (the head lamps in the example in the figure) is being operated and also stating that attention should be paid to the exhaustion of the battery (auxiliary equipment battery 30) being used.

With this notification, the user can take countermeasures for dealing with, for example, stopping an electric device that is not required to be operated, whereby convenience can be improved.

Figure 2:
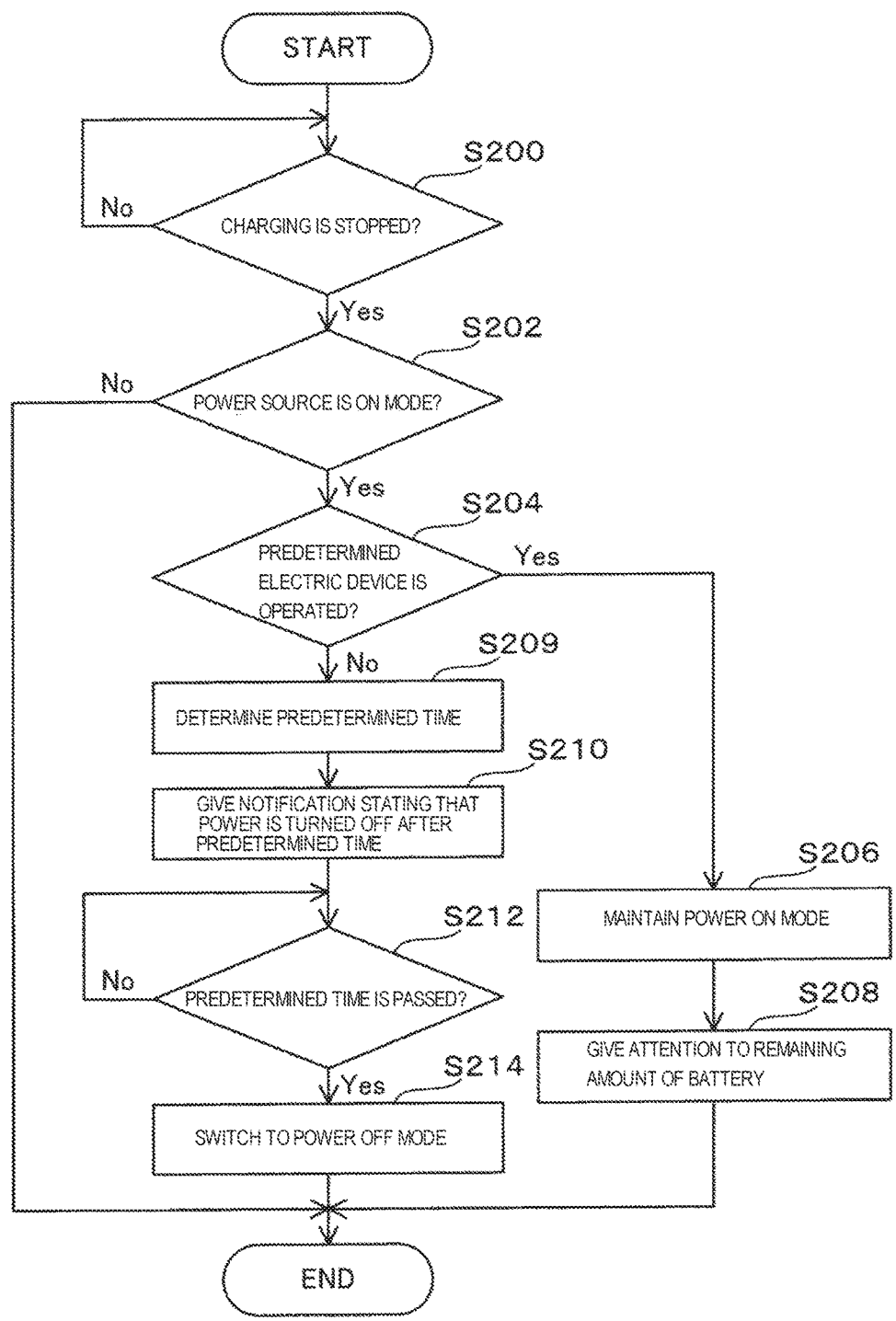
FIG. 2 is a flow chart showing the processing of a vehicle ECU (power source control device)

FIG. 2 is a flow chart showing the processing of the vehicle ECU 10 (power source control device).

First, the charging state detection section 102 detects the charging state of the drive battery 26 (at step S200). When the charging of the drive battery 26 is stopped (Yes at step S200), the power source mode switching section 104 judges whether the power source mode of the electric vehicle 20 is set at the ON mode (the power source ON mode) (at step S202).

In the case that the power source mode is not set at the power source ON mode (No at step 202), that is, in the case that the power source mode is set at the power source OFF mode, there is no influence on the drive battery 26 and the auxiliary equipment battery 30, and the processing of the flow chart is ended as it is.

On the other hand, in the case that the power source mode is set at the power source ON mode (Yes at step 202), the power source mode switching section 104 judges whether a predetermined electric device 34 (for example, the head lamps or the vehicle width lamps) is operated (at step S204).

For example, in the case that the predetermined electric device 34, such as the head lamps or the vehicle width lamps, is operated to ensure safety (Yes at step S204), the power source mode switching section 104 maintains the power source mode at the ON mode even after the stop of the charging (at step S206). After that, the notification section 106 gives a notification stating that attention should be paid to the lowering of the remaining amount of the auxiliary equipment battery for supplying electric power to the electric devices 34 (at step S208), and the processing of the flow chart is ended.

Furthermore, in the case that the predetermined electric device 34 is not operated (No at step S204), on the basis of the power consumption or the type of the electric device 34 being operated, the power source mode switching section 104 determines the length (predetermined time) of the grace time that is allowed until the power source mode is switched to the OFF mode (at step S209). The predetermined time may be a fixed value as described above.

After the predetermined time is determined, the notification section 106 gives a notification stating that the power source mode is switched to the OFF mode (the power source is turned OFF) after the predetermined time has passed (at step S210).

After that, the power source mode switching section 104 stands by until the predetermined time passes after the stop of the charging (at step S212 in the No loop shown in the chart). When the predetermined time has passed (Yes at step S212), the power source mode switching section 104 switches the power source mode to the OFF mode (at step S214), and the processing of the flow chart is ended.

As described above, in the case that the charging of the drive battery 26 is stopped while the power source mode of the electric vehicle 20 is set at the ON mode, the power source control device according to this embodiment automatically switches the power source mode to the OFF mode. This is advantageous for preventing the lowering of the remaining amount of the battery regardless of whether the user is inside the vehicle.

Furthermore, in the case that the predetermined electric device 34 is being operated, the power source control device maintains the power source mode at the ON mode even after the stop of the charging. This is advantageous for improving the convenience of the electric vehicle 20. For example, in the case that the predetermined electric device 34 is being operated for safety reasons, the safety of the user can be ensured continuously even after the stop of the charging.

Moreover, in the case that the power source mode is maintained at the ON mode, the power source control device gives the notification stating that attention should be paid to the lowering of the remaining amount of the auxiliary equipment battery for supplying electric power to the electric devices 34. This is advantageous for preventing the lowering of the remaining amount of the battery (for example, battery exhaustion) that is not expected by the user.

What's more, the power source control device switches the power source mode to the OFF mode after the predetermined time has passed after the stop of the charging. This is advantageous in the case that inconvenience occurs if the power source is turned OFF immediately, for example, in the case that an electric device 34 is performing a process for storing data.

Additionally, the power source control device gives the notification stating that the power source mode is switched to the OFF mode after the predetermined time has passed after the stop of the charging. This is advantageous for the user to take countermeasures for dealing with the OFF switching of the power source.

Still further, in the power source control device, the predetermined time is changed on the basis of the power consumption of the electric device 34 being operated, whereby the decreasing amount of the remaining amount of the battery after the stop of the charging can be suppressed within a fixed range.

Yet still further, in the power source control device, the predetermined time is changed on the basis of the type of the electric device 34 being operated. This is advantageous for setting the usable time of the electric device 34 according to, for example, the taste of the user.

The embodiment according to this disclosure will herein be summarized as described below.

(1) There is provided a power source control device including: a charging state detection section for detecting the charging state of the drive battery mounted on an electric vehicle and a power source mode switching section for switching the power source mode of the electric vehicle, wherein the power source mode switching section switches the power source mode to the OFF mode in the case that the charging of the drive battery is stopped while the power source mode is set at the ON mode.

(2) In the power source control device set forth in the above-mentioned item (1), in the case that a predetermined electric device inside the electric vehicle is being operated, the power source mode switching section maintains the power source mode at the ON mode until a predetermined condition is satisfied after the stop of the charging.

(3) The power source control device set forth in the above-mentioned item (2) is further equipped with a first notification section for giving a notification stating that attention should be paid to the lowering of the remaining amount of the auxiliary equipment battery for supplying electric power to the electric device.

(4) In the power source control device set forth in the above-mentioned item (1) or (2), the power source mode switching section switches the power source mode to the OFF mode after a predetermined time has passed after the stop of the charging.

(5) The power source control device set forth in the above-mentioned item (4) is further equipped with a second notification section for giving a notification stating that the power source mode is switched to the OFF mode during the period until the predetermined time passes after the stop of the charging.

(6) In the power source control device set forth in the above-mentioned item (4) or (5), the power source mode switching section changes the predetermined time on the basis of the power consumption of the electric device being operated.

(7) In the power source control device set forth in the above-mentioned item (4) or (5), the power source mode switching section changes the predetermined time on the basis of the type of the electric device being operated.

(8) The present invention provides a power source control method including a detecting process for detecting the charging state of the drive battery mounted on an electric vehicle and a power source mode switching process for switching the power source mode of the electric vehicle, wherein the power source mode switching process switches the power source mode to the OFF mode in the case that the charging of the drive battery is stopped while the power source mode is set at the ON mode.

(9) In the power source control method set forth in the above-mentioned item (8), in the case that a predetermined electric device inside the electric device is being operated, the power source mode switching process maintains the power source mode at the ON mode until a predetermined condition is satisfied after the stop of the charging.

(10) The power source control method set forth in the above-mentioned item (9) is further provided with a first notifying process for giving a notification stating that attention should be paid to the lowering of the remaining amount of the auxiliary equipment battery for supplying electric power to the electric device.

(11) In the power source control method set forth in the above-mentioned item (8) or (9), the power source mode switching process switches the power source mode to the OFF mode after a predetermined time has passed after the stop of the charging.

(12) The power source control method set forth in the above-mentioned item (11) is further provided with a second notifying process for giving a notification stating that the power source mode is switched to the OFF mode during the period until the predetermined time passes after the stop of the charging.

(13) In the power source control method set forth in the above-mentioned item (11) or (12), the power source mode switching process changes the predetermined time on the basis of the power consumption of the electric device being operated.

(14) In the power source control method set forth in the above-mentioned item (11) or (12), the power source mode switching process changes the predetermined time on the basis of the type of the electric device being operated.

With the aspect of the invention set forth in the above-mentioned item (1) or (8), in the case that the charging of the drive battery is stopped while the power source mode of the electric vehicle is set at the ON mode, the power source mode is automatically switched to the OFF mode. This is advantageous for preventing the lowering of the remaining amount of the drive battery or the exhaustion of the auxiliary equipment battery regardless of whether the user is inside the vehicle.

With the aspect of the invention set forth in the above-mentioned item (2) or (9), in the case that the predetermined electric device is being operated, the power source mode is maintained at the ON mode even after the stop of the charging. This is advantageous for improving the convenience of the electric vehicle. For example, in the case that the predetermined electric device (for example, head lamps) is being operated for safety reasons, the safety of the user can be ensured continuously even after the stop of the charging.

With the aspect of the invention set forth in the above-mentioned item (3) or (10), in the case that the power source mode is maintained at the ON mode, the notification stating that attention should be paid to the lowering of the remaining amount of the auxiliary equipment battery for supplying electric power to the electric devices is given. This is advantageous for preventing the lowering of the remaining amount of the battery (for example, the exhaustion of the auxiliary equipment battery) that is not expected by the user.

With the aspect of the invention set forth in the above-mentioned item (4) or (11), the power source mode is switched to the OFF mode after the predetermined time has passed after the stop of the charging. This is advantageous in the case that inconvenience occurs if the power source is turned OFF immediately, for example, in the case that an electric device is performing a process for storing data.

With the aspect of the invention set forth in the above-mentioned item (5) or (12), the notification stating that the power source mode is switched to the OFF mode after the predetermined time has passed after the stop of the charging is given. This is advantageous for the user to take countermeasures for dealing with the OFF switching of the power source.

With the aspect of the invention set forth in the above-mentioned item (6) or (13), the predetermined time is changed on the basis of the power consumption of the electric device being operated, whereby the decreasing amount of the remaining amount of the battery after the stop of the charging can be suppressed within a fixed range.

With the aspect of the invention set forth in the above-mentioned item (7) or (14), the predetermined time is changed on the basis of the type of the electric device being operated. This is advantageous for setting the usable time of the electric device according to, for example, the taste of the user.

What is claimed is:

1. A power source control device comprising:
a charging state detector configured to detect a charging state of a drive battery mounted on an electric vehicle; and
a power source mode switch configured to switch a power source mode of the electric vehicle,
wherein the power source mode switch is configured to automatically switch the power source mode from an ON mode in which a power source for an electric device is turned on to an OFF mode in which the power source is turned off in a case that charging of the drive battery is stopped while the power source mode is set at the ON mode.

2. The power source control device according to claim 1, wherein in a case that a predetermined electric device inside the electric vehicle is being operated, the power source mode switch is configured to maintain the power source mode at the ON mode until a predetermined condition is satisfied after the stop of the charging of the drive battery.

3. The power source control device according to claim 2, further comprising:
a first notifier configured to give a notification indicating that attention should be paid to lowering of a remaining amount of an auxiliary equipment battery for supplying electric power to the predetermined electric device.

4. The power source control device according to claim 1, wherein the power source mode switch is configured to automatically switch the power source mode to the OFF mode after a predetermined time has passed after the stop of the charging of the drive battery.

5. The power source control device according to claim 4, further comprising:
a second notifier configured to give a notification indicating that the power source mode is automatically switched to the OFF mode during the period until the predetermined time passes after the stop of the charging of the drive battery.

6. The power source control device according to claim 4, wherein the power source mode switch is configured to change the predetermined time based on a power consumption of the electric device being operated.

7. The power source control device according to claim 4, wherein the power source mode switch is configured to change the predetermined time based on a type of the electric device being operated.

8. The power source control device according to claim 1, wherein the power source includes a power source that provide power to an auxiliary equipment of a vehicle.

9. The power source control device according to claim 1, wherein the power source includes a power source for driving a vehicle.

10. A power source control method comprising:
a detecting process of detecting a charging state of a drive battery mounted on an electric vehicle; and
a power source mode switching process of switching a power source mode of the electric vehicle,
wherein the power source mode switching process automatically switches the power source mode from an ON mode in which a power source for an electric device is turned on to an OFF mode in which the power source is turned off in a case that charging of the drive battery is stopped while the power source mode is set at the ON mode.

11. The power source control method according to claim 10, wherein in a case that a predetermined electric device inside the electric device is being operated, the power source mode switching process maintains the power source mode at the ON mode until a predetermined condition is satisfied after the stop of the charging of the drive battery.

12. The power source control method according to claim 11, further comprising:
a first notifying process of giving a notification indicating that attention should be paid to lowering of a remaining amount of an auxiliary equipment battery for supplying electric power to the predetermined electric device.

13. The power source control method according to claim 10, wherein the power source mode switching process automatically switches the power source mode to the OFF mode after a predetermined time has passed after the stop of the charging of the drive battery.

14. The power source control method according to claim 13, further comprising:
a second notifying process of giving a notification indicating that the power source mode is automatically switched to the OFF mode during the period until the predetermined time passes after the stop of the charging of the drive battery.

15. The power source control method according to claim 13, wherein the power source mode switching process changes the predetermined time based on a power consumption of the electric device being operated.

16. The power source control method according to claim 13, wherein the power source mode switching process changes the predetermined time based on a type of the electric device being operated.

17. The power source control method according to claim 10, wherein the power source includes a power source that provide power to an auxiliary equipment of a vehicle.

18. The power source control method according to claim 10, wherein the power source includes a power source for driving a vehicle.

* * * * *